United States Patent [19]

Kaski

[11] Patent Number: 4,974,398
[45] Date of Patent: Dec. 4, 1990

[54] WEIGHT STRAP FOR A HORSE'S LEG

[76] Inventor: Laurie Kaski, 9490 Reid Rd., Swartz Creek, Mich. 48473

[21] Appl. No.: 367,763

[22] Filed: Jun. 19, 1989

[51] Int. Cl.$^5$ ............................................. B68B 1/00
[52] U.S. Cl. ......................................... 54/71; 54/82; 272/119
[58] Field of Search ............... 54/65, 71, 82; 119/127; 272/119, 121

[56] References Cited

U.S. PATENT DOCUMENTS

| | | |
|---|---|---|
| 121,880 | 12/1871 | Lewis . |
| 126,479 | 5/1872 | Murray et al. . |
| 222,796 | 12/1879 | Randall . |
| 317,526 | 5/1885 | Fenton . |
| 460,822 | 10/1891 | Hayward . |
| 487,296 | 12/1892 | Rowell . |
| 809,276 | 1/1906 | Aulton . |
| 1,101,759 | 6/1914 | Salter et al. . |
| 1,138,152 | 5/1915 | Saubestre . |
| 2,246,100 | 6/1941 | Marzani ................................. 54/82 |
| 3,490,766 | 1/1970 | Gardner ............................. 272/119 |
| 3,800,504 | 4/1974 | Gregory ................................. 54/82 |
| 3,913,302 | 10/1975 | Centers ................................. 54/65 |
| 4,140,116 | 2/1979 | Hampicke ........................... 54/82 X |
| 4,424,809 | 1/1984 | Yovankin ........................... 54/82 X |
| 4,838,546 | 6/1989 | Winston ............................. 272/119 |

FOREIGN PATENT DOCUMENTS 225693  12/1924  United Kingdom .................... 54/82

Primary Examiner—Robert P. Swiatek
Attorney, Agent, or Firm—Gifford, Groh, Sprinkle, Patmore and Anderson

[57] ABSTRACT

A weight strap for encircling the leg of a horse substantially above the fetlock and below the knee or hock. The strap includes two interattachable ends. Attachment is preferably accomplished by hook and loop fasteners. The strap comprises a nylon outer side and a neoprene inner side with a resilient foamed or expanded plastic disposed therebetween. Both the upper edge and the lower edge are padded with a foamed or expanded plastic rim. The strap is weighted by either a flexible, heavy rubber or lead insert disposed within the strap between the inner and outer sides, or one or more weights of different mass values removably and interchangeably fitted to the outer side of the strap. Both methods of adding weight to the strap may be employed in a single strap.

13 Claims, 1 Drawing Sheet

U.S. Patent     Dec. 4, 1990     4,974,398
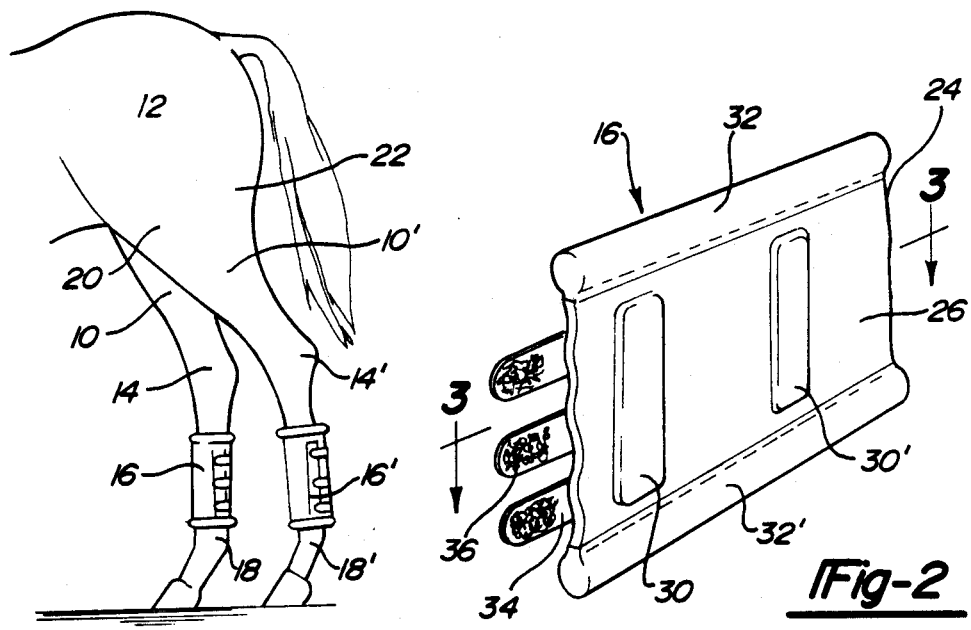
Fig-1
Fig-2
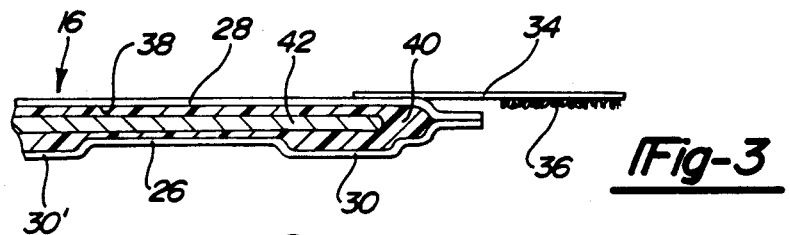
Fig-3
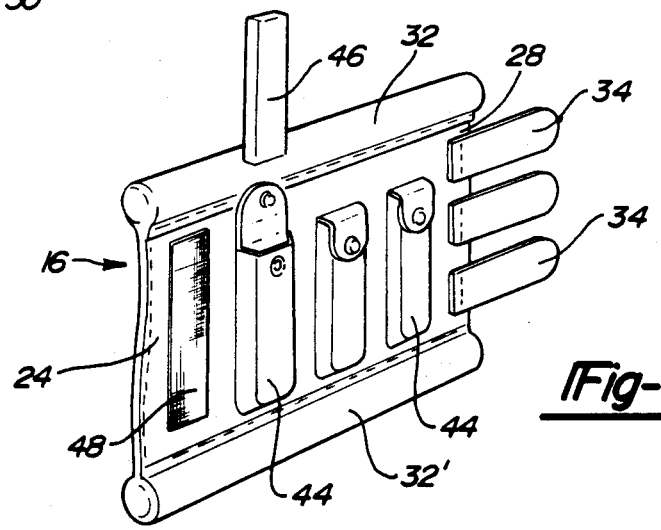
Fig-4

WEIGHT STRAP FOR A HORSE'S LEG

BACKGROUND OF THE INVENTION

I. Field of the Invention

The present invention relates generally to weighted devices for encircling a horse's leg. More particularly, the present invention relates to a flexible weight strap including an internally-provided weight and, alternatively or additionally, interchangeable, externally-fitted weights.

II. Description of the Relevant Art

The fragility and related problems associated with the musculature of a horse's leg are well known. A young horse's legs must be treated and observed with considerable care. An adult horse demands much the same attention. Perhaps the areas most susceptible to injury and improper training are the stifle joints and tendons in the back of the leg. These regions are easily damaged and otherwise require special care in treatment.

The stifle joints and tendons particularly require proper training and care in young horses. These animals typically have weak muscles and joints in general that require special attention, although the stifles and back leg muscles particularly require such attention.

Several attempts have been made to attack at least one of these recurring problems, that being the prevention and care of horses with leg problems. Typically the treatment has included boots for a horse's hooves, leg supports or stockings. These treatments, however, were hindered by limited knowledge and understanding of the physiology involved in treating joints and muscles. For example, early boots were directed to confining muscles to reduce swelling or to providing muscle support by bracing certain muscles or groups of muscles. However, these approaches failed to provide a direct method by which the muscles are strengthened. In any event, known methods also did little for training the horse's legs, especially the legs of young horses.

Accordingly, the prior approaches to solving the problems of devices for healing a horse's injured leg muscles or joints or to training these areas have failed to solve known problems.

SUMMARY OF THE PRESENT INVENTION

The present invention provides a weight strap for encircling the leg of a horse substantially above the fetlock and below the knee or hock. The strap includes two interattachable ends. One of the ends includes one or more belts. The belts are removably fastenable to the other end using hook and loop fasteners.

The strap is flexible and comprises an outer side composed of a high-strength, resilient synthetic material such as nylon. The strap also includes an inner side composed of a synthetic rubber such as neoprene. The rubber inside is provided to prevent absorption of the horse's sweat.

The strap includes a padded upper edge and a padded lower edge for providing protection to the horse's leg. The padding is composed of a resilient foamed or expanded plastic. This material may also be disposed between the inner side and the outer side of the strap to provide an added measure of padding for comfort to the horse.

On the inner side of the strap are fitted contoured inserts for providing a snug and supportive fit between the strap and the depressions found behind a horse's cannon bone. There are provided two inserts, one fitted to each side of the horse's leg.

The strap is weighted in two possible ways, each of which being usable separately or in combination with the other.

One approach includes the placement of a heavy strip of rubber, lead sheeting or lead shot or similarly weighted material between the inner side and the outer side, thus incorporating the weight therein. The presence of the weighted material may be in addition to the foam padding also disposed between the two sides. Using this approach, straps of different weights may be provided for different applications. For example, a weight strap according to the present invention having a weight of one pound /0.45 kilograms may be suitable for a yearling whereas a strap having a weight of two pounds /0.90 kilograms may be appropriate for a two year old.

The alternate approach to the internally weighted strap according to the present invention is to provide a strap having one or more weights removably attachable to its outer side. Attachment is accomplished by providing one or more weight pockets to the outer side wherein one or more weights are removably inserted. The weights may be of different amounts or mass values such as one, two or three pounds, or 0.45, 0.90 or 1.35 kilograms respectively.

As suggested, these two methods of weighting the weight strap may also be incorporated into a single strap.

Through a better understanding of the horse's anatomy and physiology and through general advancements in kinesiology and the understanding of joints, application of the present invention to a young horse or to an adult horse having weakened or damaged stifle joints or back leg muscles provides a successful approach to healing and training. (While such an application is directed to use for the rear legs, application of a weight strap according to the present invention may have a similar utility as applied to the horse's front legs.) Application of the present invention has proved particularly successful in providing training for the gaiting horse.

One of the significant advantages of the present invention over known devices is the inclusion and strategic positioning of one or more weights.

Other advantages and features of the present invention will become more apparent from the following detailed description when read in conjunction with the accompanying drawings.

BRIEF DESCRIPTION OF THE DRAWING

The present invention will be more fully understood by reference to the following detailed description of the preferred embodiments of the present invention when read in conjunction with the accompanying drawing, in which like reference characters refer to like parts throughout the views, and in which:

FIG. 1 is a raised elevational view illustrating the weight strap according to the present invention in place on a horse's rear legs;

FIG. 2 is a perspective view of the inner side of the strap according to the present invention;

FIG. 3 is a partial sectional view of the strap taken along line 3—3 of FIG. 2; and FIG. 4 is an alternate embodiment of a weight strap according to the present invention.

DETAILED DESCRIPTION OF THE PREFERRED EMBODIMENTS OF THE PRESENT INVENTION

The drawing discloses the preferred embodiments of the present invention. While the configurations according to the illustrated embodiments are preferred, it is envisioned that alternate configurations of the present invention may be adopted without deviatinq from the invention as portrayed. The preferred embodiments are discussed hereafter.

Referring to FIG. 1, the rear legs 10, 10' of a horse 12 are illustrated. Below each hock 14, 14' (or knee [not illustrated] if the application is made to the front legs [not illustrated] of the horse 12) are provided a pair of weight straps 16, 16' according to the present invention. The straps 16, 16' are situated above the fetlocks 18, 18'.

Positioned as they are on the legs 10, 10', the straps 16, 16' act to heal or strengthen both the stifle joint 20 and the muscles and tendons located at the leg's back 22. Mere walking or trotting will act, utilizing the weight of the straps 16, 16', to heal and strengthen the legs 10, 10' generally, but particularly the stifle joints 20 and leg's back 22. Of course, the sraps 16,16' could be longer or shorter depending upon the construction of the horse 12.

Referring to FIG. 2, a perspective view of the strap 16 is illustrated. The strap 16 comprises a body 24 having an inner side 26 and an outer side 28 (see FIGS. 3 and 4). The strap 16 is flexible to allow it to encircle the leg 10 (as illustrated in FIG. 1). Accordingly, all of the component parts of the strap 16 must also be flexible. Therefore, the inner side 26 is preferably composed of a synthetic rubber such as neoprene to make the strap 16 sweatproof as well as flexible. Other water-resistant and resilient materials may be used, however.

Positioned on the inner side 26 of the strap 16 are a pair of contoured inserts 30, 30'. The inserts are situated so as to snugly fit into the depression of the leg 10 normally situated behind the cannon bone. The insert 30 fits on one side of the leg 10 while the insert 30' fits on the other. In either instance the inserts 30, 30' act to provide stability to the strap 16 and comfort to the horse 12.

At the upper and lower ends of the body 24 are provided a pair of padded rims 32, 32'. The rims 32, 32' are preferably composed of a resilient, yieldable material such as a foamed or expanded plastic. The rims 32, 32' provide the horse 12 with added comfort when the strap 16 is in place. This construction also helps to prevent chafing of the leg 10.

Attachment of the ends of the body 24 together is accomplished preferably by hook and loop fasteners. One or more belts 34 extend from the body 24. As illustrated, the belts 34 are provided with a loop pile 36. Other conventional fasteners may be fitted such as buckles or snaps (not illustrated).

Referring to FIG. 3, a cross-sectional view of the strap 16 is illustrated taken along line 3—3 of FIG. 2. This view illustrates well the internal construction of the strap 16.

Disposed between the inner wall 26 and the outer wall 28 is a cavity 38. The cavity may be filled with a resilient, yieldable foamed or expanded plastic core 40. This padded construction offers added comfort to the horse 12.

The strap 16 according to the present invention offers two methods for providing the necessary mass to make the strap 16 weighted. The first method is illustrated in FIG. 3.

Still with reference then to FIG. 3, an inner weight core 42 of a heavy, polymerized material such as rubber is centrally disposed within the cavity 38. The weight core 42 may also be composed of a flexible strip of lead or lead shot. In any material, the weight core 42 must be flexible enough to allow the strap 16 to encircle the leg 10 of the horse 12, but must also be massive enough to provide the necessary therapeutic weight.

As an alternative or in addition to the construction of the weighted core 42 illustrated in FIG. 3, one or more weights may be externally provided. This construction is illustrated in FIG. 4.

With reference now thereto, FIG. 4 illustrates the outer side 28 of the strap 16 having fitted thereto a series of weight pockets 44. The outer side 28 is preferably composed of a high-strength, resilient synthetic material such as nylon.

The pockets 44 provide for removable insertion of an interchangeable weight 46. The individual weights 46 may be of different mass values (i.e., one ounce /28.35 grams, two ounces /56.7 grams, one pound /0.45 kilograms) and may be used individually or in combination with weights of the same or different mass values.

The loop pile 36 of the belts 34 may be removably attached to a hook pile 48 provided at one end of the body 24.

Having described my invention, however, many modifications thereto will become apparent to those skilled in the art to which it pertains without deviation from the spirit of the invention as defined by the scope of the appended claims.

I claim:

1. A flexible weight strap adapted to encircle the leg of a horse substantially above the fetlock and below the knee or hock, said weight strap comprising:
    a flexible strap body having a first end and a second end;
    means for attaching said first end to said second end;
    said body having an inner side and an outer side;
    said inner side of said body having fitted thereto a pair of contoured inserts for fitting complementarily to the depressions situated behind the horse's cannon bone;
    said body including an upper edge and a lower edge;
    said outer side of said body being composed of a high-strength, resilient synthetic material;
    said inner side of said body being composed of a rubber;
    said body including a foamed polymerized material disposed between said outer side and said inner side; and
    said body including one or more weights.

2. The weight strap of claim 1 wherein said one or more weights are of different mass values.

3. The weight strap of claim 1 wherein said one or more weights are disposed within pockets fitted to said outer side.

4. The weight strap of claim 1 wherein said first end includes one or more belts for attachment to said second end.

5. The weight strap of claim 4 wherein said one or more belts and said second end include hook and loop fasteners for detachable attachment thereof.

6. The weight strap of claim 1 wherein said high-strength, resilient synthetic material is nylon.

7. The weight strap of claim 1 wherein said inner side is composed of a synthetic rubber.

8. The weight strap of claim 7 wherein said synthetic rubber is neoprene.

9. The weight strap according to claim 1 wherein said one or more weights are composed of lead.

10. The weight strap according to claim 1 wherein said one or more weights are composed of rubber.

11. The weight strap according to claim 1 wherein said upper edge and said lower edge are padded.

12. The weight strap according to claim 1 wherein said one or more weights are disposed between said inner side and said outer side.

13. The weight strap according to claim 1 wherein said one or more weights are removably fittable to said outer side.

* * * * *